2,978,335
WHIPPING AGENT AND METHOD OF PREPARING THE SAME

David P. Kidger, Glen Rock, N.J., and Robert J. Baeuerlen, Park Forest, Ill., assignors to Swift & Company, Chicago, Ill., a corporation of Illinois No Drawing. Filed Jan. 7, 1959, Ser. No. 785,339

11 Claims. (Cl. 99—113)

This invention relates to a process for the treatment of water soluble proteinaceous materials. More particularly, the invention relates to a method for improving the functional properties of egg whites so that angel food cakes that are baked from such egg whites have an increased volume.

It is important that egg white products, whether marketed in the liquid, dried, or frozen state, have good whipping properties. Large quantities of egg whites are employed in the baking industry and in the preparation of bakery products such as in the manufacture of angel food cake, and it is important that the egg white have a maximum foaming power, foam stability, and a short whipping time to provide a given foam volume.

Whipping properties are measured by determining foam density at a given whipping time, or by determining the whipping time necessary to obtain a given density, or by measuring the time necessary to whip to the consistency generally recognized by those skilled in the art to produce optimum baking results. In addition to these measurements, the height or volume of angel food cake prepared from such egg white compositions is a good measure of whipping properties.

One of the objects of this invention is the provision of an improved method for preparing egg white compositions which provide improved angel food cake volumes.

Another object of the invention is to provide proteinaceous products which can be whipped in a shorter period of time to produce a stable foam.

A further object is to provide a dehydrated egg white material which is readily reconstitutable and which contains an edible whipping improver.

Still a further object of the invention is the provision of a whipping agent which can readily be incorporated in egg white materials to impart to the egg white materials significant benefits in functionality.

Additional objects, if not specifically set forth herein, will be readily apparent to those skilled in the art from the detailed description which follows.

Generally, this invention contemplates the addition of a novel whipping agent to water soluble proteinaceous materials to improve the properties thereof. The whipping agent has particular application to the improvement of egg whites but is not limited to this area of use. In the case of dehydrated egg whites the additive is incorporated either before or after drying. The whipping agent can be added to the egg white either in a concentrated form or by dispersal of the additive in a liquid carrier prior to addition to the egg white. The improved whipping agent contemplated in this invention is produced by the esterification of a polyhydric alcohol with a hydroxy polycarboxylic acid.

More specifically, the present invention includes the incorporation of a small amount, around 0.1–3% based on the weight of the liquid egg whites of the egg white additive. Smaller amounts of the whipping agent may also be employed with decreasing effectiveness down to about .005% additive, below which point no substantial improvement in whipping properties is noted. Larger amounts of the whipping agent, up to around 5% based upon the weight of the liquid egg white, may also be employed, although the most desirable range is around 0.1–1%. While all of the compositions coming within the scope of this invention do not exhibit equal effectiveness in imparting to the protein materials improved whippability and improved foam stability, it should be noted that all of the compounds have some effect upon the whipping properties of egg white and also upon the volume of cakes made from such egg whites.

The improved additives are prepared by heating an aliphatic polyhydric alcohol with an aliphatic hydroxy polycarboxylic acid. Although the reaction is one of esterification primarily, many side reactions take place because of the multiplicity of functional groups in the reactants and the elevated temperatures at which the condensation takes place. The reaction product is almost entirely saponifiable, and free carboxyl groups present in the reaction mixture decrease as the severity of the reaction conditions is increased. These factors represent substantial evidence that the reaction involves esterification primarily, although substantial increases in viscosity of the reaction mixture indicates that there is some polyester formation and also some cross-linking, particularly in the case where branch-chained polyols such as pentaerythritol and citric acid are reacted.

The esterification reaction is conducted simply by mixing the acid component and the aliphatic polyol in a ratio providing about 1 polyol hydroxyl group for each acidic carboxyl group and heating until the free acidity of the mixture has been reduced to the point corresponding to the esterification of at least half of the carboxyl groups present in the acid component. Preferably the reaction should be carried out until two-thirds of the carboxyl groups present in the acid component are reacted. About twelve hours' reaction time is required when the reaction temperature is maintained at about 100° C. although this reaction time can be reduced by increasing the reaction temperature. Only about five hours reaction time is required when the reaction temperature is maintained at about 160°. The use of vacuum, vigorous agitation, and high reaction temperature insure the most efficient procedure, particularly in those instances where the reactants are not particularly volatile. For example, a reaction carried out at a temperature of about 160–180° C. and a pressure of 100 mm. mercury proceeds to substantial completion in about an hour. While catalysts can be employed to speed up the reaction, the use of catalysts is not required, since the partial esters of the carboxylic acids when formed are sufficiently acidic to catalyze further esterification.

Maximum whipping power and maximum foam stability is imparted to the egg white materials by those compositions having the proper balance of functional groups in the mixture, namely alkyl substituents. Propylene and butylene glycols are particularly desirable as the polyol reactant, while citric, tartaric and malic acids are favored polycarboxylic acid reactants.

Suitable aliphatic polyhydric alcohol reactants include generally the lower aliphatic glycols and polyhydroxylated alkyl and alkylene compounds having from 2–6 carbons. This includes in addition to glycols the trihydric alcohols as well as the tetritols, pentitols, hexitols, and derivatives thereof. Specific polyhydric alcohols contemplated include ethylene glycol, 1,2-propylene glycol, 1,3-propylene glycol, glycerol, monoacetin, monoethylin, monomethylin, 1,3-butylene glycol, 2,3-butylene glycol, sorbitol, pentaerythritol, 1,2-amylene glycol, 2,3-amylene glycol, 1,2-butylene glycol, 3-methyl butylene glycol-1,2-erythritol, tetramethylene glycol, polyethylene glycols, polypropylene glycols, polyglycerols, and beta beta dimethyl trimethylene glycol.

Suitable hydroxy polycarboxylic acids include malic acid, tartronic acid, mucic acid, citric acid, tartaric acid, saccharic acid, trihydroxy glutaric acid, alpha hydroxy glutaric acid, and citromalic acid. These aliphatic acids comprising radicals made up of methylene groups substituted with more than one carboxyl group and one or more hydroxyl group when combined with the polyfunctional polyhydric alkyl or alkalene alcohol provide a very advantageous and peculiar combination of lipophylic and hydrophylic groups imparting greatly improved whippability to protein materials, particularly albumens.

Secondary reactions which take place along with the esterification may involve dehydration (as with sorbitol), lactonization (as with hydroxy glutaric acid), and other side reactions, some of which lead to the development of highly colored and odoriferous reaction products. While the acids are a preferred reactant, it is possible to also employ the lower alkyl esters of such acids with good results. In cases where the lower alkyl esters are employed, the lower alkyl alcohol is split off as distinguished from the condensation reaction involved where the glycol and acid are reacted. The corresponding acid anhydrides or inner lactones of the acid may also be substituted for the acid reactant. Particularly desirable reactants where increased solubility is required are the polyesters or ethers of glycerol or sorbitol as the polyol, and a monoacidic ester of tartaric acid as the carboxylic acid reactant.

Because of their ready availability and the suitability of the reaction product for use in edible materials, the preferred polyol reactants include glycerol, propylene glycol, trimethylene glycol, and 1,3-butylene glycol; while the preferred polycarboxylic acid reactants are citric acid, malic acid and tartaric acid.

The preparation of the whipping agent is as follows:

EXAMPLE I

Equimolecular quantities of anhydrous citric acid (1345 grams) and propylene glycol (550 grams) are heated to 155° C. with stirring for three hours, while passing a rapid stream of carbon dioxide through the reaction mixture. Water and excess glycol are distilled over and collected. The reaction product is a colorless, viscous liquid at 100° C., and sets to a plastic solid at room temperature. For convenience in handling it is remelted at 60–70° C. and dissolved in water to form a 50% solution, which after filtration is ready for use.

EXAMPLE II

A 3-to-1 molar ratio of reactants is illustrated in this example. 456 grams propylene glycol (6 mols) and 420 grams citric acid monohydrate (2 mols) are placed in a flask equipped with efficient stirring and a condenser to recover the distillate. Heating was maintained at 160–170° C. for four hours. The progress of the reaction was measured by a determination of unesterified citric acid remaining in the reaction mixture after each hour of reaction time. Small samples of the reaction mixture were taken at intervals during the progress of the reaction, and the percent citric acid remaining in the reaction mixture was determined.

Reaction time:            Percent citric acid
    0 _____ 46.8
    1 hour _____ 17.8
    2 hours _____ 11.9
    3 hours _____ 8.4
    4 hours _____ 5.5

As the reaction proceeds, the apparent viscosity of the reaction mixture increases while water solubility decreases. Samples taken after 1 hour, 2 hours, and 3 hours of reaction time were all soluble in water at a 50% concentration; although the 3-hour sample was somewhat less soluble than the 1-hour and 2-hour samples, as evidenced by some difficulty in obtaining solution. The 4-hour sample was not completely soluble without the addition of a small amount of alkali. Each of these samples imparted to egg white materials to which they were added some improvement in whipping characteristics.

EXAMPLE III

A stainless steel reaction kettle fitted with a cover, condenser, and stirrer was charged with 28.8 pounds of citric acid and 34.2 pounds of propylene glycol. A moving blanket of carbon dioxide gas was provided over the reaction mixture and the agitated mixture was heated to raise the temperature to about 325° F. During the first two hours of the heating period, 6.6 pounds of distillate were collected. The total distillate was increased to 9.2 pounds after an additional hour reaction time at 325° F. The product was then cooled to 220° F. and 50 pounds of distilled water was added to the mixture with vigorous agitation. Dilution with water is effected for convenience in handling of the viscous reaction product. The yield of whipping agent solution is 11 gallons. A repeat of the above run heating the reaction mixture at 325° for five hours resulted in the collection of 7.4 pounds of distillate. Here the yield is 12 gallons of the solution of the additive.

The following table shows the course of a plant scale reaction and the improvement in the activity of the whipping agent as the reaction proceeds to completion. In this reaction 342 lbs. of propylene glycol and 288 lbs. of citric acid were used.

Table 1

| Reaction Time, min. | Reaction Temperature, ° F. | Amount of Distillate Removed (lbs.) | Angel Food Cake Baking Performance Data | |
|---|---|---|---|---|
| | | | Whip Time, min. | Hgt. in mm. |
| 0 | 70 | | | |
| 10 | 200 | Started over | | |
| 35 | 290 | 16 | | |
| 45 | 292 | 27 | | |
| 50 | 296 | 35 | 3 | 129 |
| 55 | 298 | 37 | | |
| 60 | 306 | 53 | 3 | 130 |
| 70 | 308 | 61 | | |
| 75 | 310 | 66 | | |
| 80 | 314 | 70 | 2½ | 133 |
| 105 | 322 | 86 | | |
| 115 | 324 | 92 | | |
| 150 | 320 | 100 | 2 | 136 |

It will be noted that as the reaction mixture is heated and the inert gas is passed through, water is distilled off along with some unreacted glycol. As the reaction proceeds, the rate of removal of distillate increases and as the reaction nears completion, the rate of formation of distillate decreases considerably, with the last few drops coming over a longer period of time. Note that the last 8 pounds of distillate removed in the above example came off over a period of 35 minutes, whereas the major proportion of distillate came over during a much shorter time. Theoretically, about 12% by weight (basis citric acid reactant) of the reaction mixture should be recovered as water in the distillate. Usually more than this amount is recovered since part of the distillate as mentioned previously consists of unreacted glycol. It is also evident that as the reaction nears completion, the functionality of the samples withdrawn at varying times during the reaction increases.

In the baking performance data which follows a conventional formula dry mix angel food cake formula was used. The reaction product was added to the dry egg white solids at the level of 2.0% before reconstitution of the egg whites. The egg whites were whipped at speed 10 (about 950 r.p.m.) on a household type dual beater Hamilton-Beach mixer model No. H. All ingredients were conditioned to 75° F. before whipping was started. The stated whip time is the time required to produce the appearance and consistency of the foam known to produce greatest cake volume. The angel food cake height in millimeters was measured as follows: The baked cake was cooled completely in an inverted position, then removed from the pan and placed inverted on the table top. A thin ruler was placed across the top of the cake and the distance from the table top to the bottom edge of the horizontal ruler was measured with another ruler.

The following table shows the effectiveness of the citric acid-propylene glycol reaction product (as prepared in accordance with the procedure of Example III) in decreasing whipping time and in providing improved cake volume in angle food cakes prepared from egg whites containing varying amounts of the whipping agent improver. The whip time selected in each case was optimum for the particular additive. The baking test employed is the same as that employed in gathering data for Table No. 1.

Table 2

| Dried Egg White Composition | Whip Time in Minutes | Cake Height in mm. |
|---|---|---|
| A. Control—dried egg white containing no added whipping agent | 4 | 129 |
| B. Composition A plus 0.1% PG.-CA. additive | 4 | 129 |
| C. Composition A plus 0.3% PG.-CA. additive | 3 | 134 |
| D. Composition A plus 0.75% PG.-CA. additive | 3 | 136 |
| E. Composition A plus 1% PG.-CA. additive | 3 | 135 |
| F. Composition A plus 2% PG.-CA. additive | 3 | 132 |

PG -CA. denotes the propylene glycol-citric acid reaction product, the preparation of which is set forth above. This additive is added in the form of an aqueous solution.

In Table 3 which follows, the cake height of angel food cakes prepared from the dried egg whites containing the reaction product of propylene glycol and citric acid is compared with the cake height of cakes prepared from dried egg whites containing a known whipping improver—triethyl citrate.

Table 3

| Dried Egg White Composition | Cake Height in mm. at Whip Times | | | | |
|---|---|---|---|---|---|
| | 1 min. | 2 min. | 3 min. | 4 min. | 6 min. |
| A. Dried egg white containing no whipping agent | 40 | 113 | 130 | 129 | 128 |
| B. Composition A plus 0.15% triethyl citrate | 129 | 135 | 127 | 127 | 127 |
| C. Composition A plus 1% triethyl citrate | 127 | 132 | 128 | 128 | 126 |
| D. Composition A plus 1% PG.-CA. | 130 | 136 | 135 | 130 | 132 |

In each of the above comparisons, the control cake was prepared from egg whites from the same source as the test samples.

While the foregoing examples are directed primarily to edible materials, there are many industrial proteins which may be improved considerably by the use of the compositions of this invention. Inedible egg or blood albumen and proteinaceous compositions derived from soya protein or gelatin may advantageously be treated with the compositions of this invention to alter their whipping or foaming properties. Although some of these proteins may ultimately be incorporated in food products such as bakery products, confectionery icings, etc., they also may be employed in industrial applications such as in industrial foams, as air entrainment media for concrete, and as protective colloids.

The following reaction conditions and reactants provide compositions imparting to albumen-type material improved whipping characteristics, and although some of the compositions would not be suitable where edible products are involved, these additives provide significant benefits in industrial applications:

Table 4

| Example No. | Acid | Mols | Polyol | Mols | Time, hours | Temp., °C. | Press., mm. | Agitation |
|---|---|---|---|---|---|---|---|---|
| IV | Citric | 2 | Ethylene glycol | 6 | 3½ | 135–140 | 50 | Yes. |
| V | Malic | 1 | Dipropylene glycol | 1 | 4 | 150 | 50 | Yes. |
| VI | Citric | 1 | Hexaethylene glycol | 3 | 5 | 160 | 70 | Yes. |
| VII | Tartaric | 1 | Trimethylene glycol | 1 | 4 | 140 | 35 | Yes. |
| VIII | Malic | 3 | Glycerol | 2 | 6 | 160 | 20 | Yes. |
| IX | Citric | 2 | Butylene glycol 1,-3 | 3 | 12 | 105 | 760 | No. |
| X | Tartaric | 1 | Propylene glycol | 1 | 12 | 100 | 760 | No. |
| XI | Malic | 1 | ...do | 1 | 8 | 105 | 760 Stream of $CO_2$ | No. |

Of Examples IV through XI, V, VII, IX and X exhibited a profound effect on the whipping time of egg white and the volume of the angel food type cakes baked therefrom. The others exhibited a definite effect but not to the same degree.

An additional advantage provided by the whipping agents of the present invention lies in the fact that the improvement in cake height, whipping time, foam density and foam stability is imparted to egg whites which contain small amounts of egg yolk. This is a surprising benefit since, in general, whipping agent improvers ordinarily lose a substantial amount of their effectiveness if egg yolk is present. Conventional egg whites comprise about 88% water and 12% solids and although the examples are directed particularly to liquid egg whites, egg white materials in other forms may be treated with equal effectiveness. Egg white products which may be improved by treatment in accordance with this invention include desugared egg whites, whether desugared by fermentation, enzyme or other desugaring treatment and also include dehydrated egg whites as well as egg whites in a fluid carrier or frozen egg white preparations.

Obviously, many modifications and variations of the invention as hereinbefore set forth may be made without departing from the spirit and scope thereof, and therefore only such limitations should be imposed as are indicated in the appended claims.

We claim:
1. A new composition of matter comprising a proteinaceous material having embodied therein a water-soluble polyester prepared by the esterification of an aliphatic glycol having 3–4 carbon atoms with a polycarboxylic hydroxy aliphatic acid having 4–6 carbon atoms, the amount of said water-soluble polyester being sufficient to impart improved foaming properties to the proteinaceous material.

2. The composition of matter comprising a water soluble proteinaceous material and the product obtained by reacting citric acid with propylene glycol with removal of water from the reaction mixture at a temperature above about 100° C. and below the decomposition temperature, and cooling the reaction mixture whereby to obtain a viscous reaction product.

3. A composition in accordance with claim 1 wherein the proteinaceous material is gelatin.

4. A method for imparting to an egg white composition improved whipping properties comprising embodying in said egg white composition about 0.1–5% of the product obtained by reacting citric acid with propylene glycol at a temperature of about 100° to about 180° C.

5. A composition in accordance with claim 1 wherein the proteinaceous material is egg white.

6. An egg white composition having improved whipping properties comprising egg white and about 0.1-3% of a water-soluble polyester prepared by the esterification of an aliphatic glycol having 3-4 carbon atoms with a polycarboxylic hydroxy aliphatic acid having 4-6 carbon atoms.

7. A composition in accordance with claim 1 wherein the proteinaceous material is inedible.

8. A dehydrated egg white composition having improved whipping properties when reconstituted in a liquid carrier comprising dried egg whites and product obtained by reacting citric acid with propylene glycol with removal of water from the reaction mixture at a temperature above about 100° C., and below the decomposition temperature, and cooling the reaction mixture whereby to obtain a viscous reaction product.

9. A liquid egg white composition having the property of improving angel food cake volume comprising liquid egg whites and less than about 5% based on the weight of the liquid egg whites of the product obtained by reacting citric acid with propylene glycol with removal of water from the reaction mixture at a temperature above about 100° C., and below the decomposition temperature, and cooling the reaction mixture whereby to obtain a viscous reaction product.

10. The method of preparing egg white material having improved whipping properties which comprises adding to egg white at least about 0.1% of the product obtained by reacting citric acid with propylene glycol with removal of water from the reaction mixture at a temperature above about 100° C., and below the decomposition temperature, and cooling the reaction mixture whereby to obtain a viscous reaction product.

11. The method of preparing dried egg whites which upon reconstitution with a liquid exhibit improved whipping properties which comprises adding to an aqueous solution of egg whites at least about 0.1% based on the weight of said aqueous solution of a water soluble polyester prepared by the esterification of an aliphatic glycol having 3-4 carbon atoms with a polycarboxylic hydroxy aliphatic acid having 4-6 carbons, and drying said aqueous solution containing said additive.

References Cited in the file of this patent

UNITED STATES PATENTS

| | | |
|---|---|---|
| 1,421,604 | Steffens | July 4, 1922 |
| 2,142,511 | Harris et al. | Jan. 3, 1939 |
| 2,637,654 | Kothe | May 5, 1953 |
| 2,692,201 | Conrad | Oct. 19, 1954 |